United States Patent [19]
Tajima et al.

[11] Patent Number: 4,835,219
[45] Date of Patent: May 30, 1989

[54] POLYETHYLENE COMPOSITION

[75] Inventors: Yoshio Tajima, Tokyo; Kazutosi Nomiyama, Akishima; Yoshiyuki Shimo; Nobuyuki Kuroda, both of Yokohama; Kazuo Matsuura, Tokyo, all of Japan

[73] Assignee: Nippon Oil Co., Ltd., Tokyo, Japan

[21] Appl. No.: 131,735

[22] Filed: Dec. 11, 1987

[30] Foreign Application Priority Data

Dec. 18, 1986 [JP] Japan ................. 61-300152

[51] Int. Cl.$^4$ .................. C08L 23/06; C08L 23/08
[52] U.S. Cl. ................................. 525/240
[58] Field of Search ........................... 525/240

[56] References Cited

U.S. PATENT DOCUMENTS

| | | | |
|---|---|---|---|
| 4,230,831 | 10/1980 | Sakurai et al. | 525/240 |
| 4,336,352 | 6/1982 | Sakurai et al. | 525/240 |
| 4,461,873 | 7/1984 | Bailey et al. | 525/240 |
| 4,536,550 | 8/1985 | Moriguchi et al. | 525/240 |
| 4,617,352 | 10/1986 | Page et al. | 525/240 |

Primary Examiner—Carman J. Seccuro
Attorney, Agent, or Firm—Oblon, Fisher, Spivak, McClelland & Maier

[57] ABSTRACT

Disclosed is polyethylene composition having excellent environmental stress cracking resistance (ESCR) and giving molded articles with good surface properties.

This composition comprises a blend of two specific types of polyethylene selected with due consideration for their molecular weight distribution in addition to their molecular weights, so that it has excellent melt tension, ESCR and moldability. Accordingly, it can suitably be used in blow molding and extrusion molding to produce molded articles with no shark skin, as well as vessels of very large size.

This composition is formed by blending (A) polyethylene obtained according to a two-step polymerization process using a Ziegler catalyst containing magnesium and titanium, and (B) high-molecular-weight polyethylene obtained with the aid of a chromium-containing catalyst, in a specified proportion.

8 Claims, No Drawings

POLYETHYLENE COMPOSITION

BACKGROUND OF THE INVENTION

1. Field of the Invention

This invention relates to polyethylene composition having excellent melting characteristics and moldability and giving molded articles with good surface properties. More particularly, it relates to polyethylene composition which is formed by blending polyethylene obtained according to a two-step polymerization process using a Ziegler catalyst, with high-molecular-weight polyethylene obtained with the aid of a catalyst containing a chromium compound, which has excellent environmental stress cracking resistance (hereinafter referred to as ESCR) and gives molded articles with good surface properties, and which is suitable for use in blow molding and extrusion molding.

2. Description of the Prior Art

Generally, polyolefin used for the fabrication of molded articles such as bottles, cable conduits, very thin films and the like must withstand molding conditions satisfactorily in the plastic state so as to be easily formed into the desired shape. To this end, it is desirable to use polyolefin having a high melt index (i.e., having a low average molecular weight). However, such high-melt-index polyolefin inevitably have low strength characteristics such as impact strength, tensile strength and the like. On the other hand, low-melt-index polyolefin have high strength, but suffer from poor moldability. It is known that this problem can be solved by using polyolefin having a wide molecular-weight distribution.

In recent years, the properties required for polyethylene have become more and more diverse. Moreover, from the viewpoint of saving of resources, there is a growing tendency to minimize the amount of resin used without impairing its properties. In the case of bottles and films, for example, the recent tendency of the art is to minimize their thickness while retaining their strength. Accordingly, there is a strong demand for polyethylene which, when used in small amounts, can exhibit good moldability and excellent properties such as impact strength, tensile strength, ESCR, etc.

Furthermore, polyethylene has recently attracted much attention as a material for the fabrication of vessels of very large size, such as automobile fuel tanks, drums and the like. The polyethylene used in such applications must have high melt tension, high impact strength and good ESCR. As described above, these requirements can be satisfied by widening its molecular-weight distribution.

There have been proposed a number of processes for the preparation of polyethylene having a wide molecular-weight distribution.

One type of processes comprise blending high-molecular-weight polyethylene with low-molecular-weight polyethylene (Japanese Patent Publication No. 3215/'70 and Japanese Patent Laid-Open No. 133136/'82).

Another type of processes involves multistep polymerization including two or more steps (Japanese Patent Publication No. 11349/'71 and Japanese Patent Laid-Open No. 19788/'77).

Although the polymer obtained by these processes have a wide molecular-weight distribution and fairly good ESCR, they still have the disadvantage of exhibiting inadequate melt viscoelasticity at the time of molding and tending to give molded articles with gel particles and/or shark skin.

Japanese Patent Laid-Open No. 196345/'84 has proposed polyethylene composition having improved moldability and physical properties. It is described therein that "improvements in moldability and physical properties have been achieved by connecting the low-molecular-weight and high-molecular-weight fractions of polyethylene prepared by two-step polymerization using a magnesium-containing Ziegler catalyst, with polyethylene prepared with the aid of a catalyst comprising a combination of a chromium compound and an organometallic compound and characterized by an intermediate molecular weight, a relatively wide molecular-weight distribution and a moderate Barus effect, so that the molecules are properly intertwined to assume the optimum molecular structure."

Moreover, Japanese Patent Laid-Open No. 100444/'79 has provided "polyethylene resin composition having improved ESCR which is formed by blending homopolymer of ethylene, or copolymer of ethylene and an α-olefin, having a relatively low molecular weight and high density of not less than 0.955 g/cm$^3$, with a copolymer of ethylene and an α-olefin of 4 or more carbon atoms having a relatively high molecluar weight and a low density 0.910 to 0.950 g/cm$^3$."

Although the compositions provided by the aforementioned Japanese Patent Laid-Open Nos. 196345/'84 and 100444/'79 have improved moldability and ESCR, their melt tension cannot be regarded as adequate and still remains to be improved. Moreover, since polymer having substantially different molecular weights are blended, they do not have satisfactorily good dispersibility (or compatibility) and the resulting composition tends to give molded articles with shark skin. In order to improve the compatibility, it is conceivable to raise the blending temperature or use a mixer having high shearing force. However, this may undesirably cause breakage or deterioration of the polymer chains.

BRIEF SUMMARY OF THE INVENTION

In order to overcome the above-described disadvantages, the present inventors made exhaustive studies. As a result, it has been found that, by properly controlling the molecular-weight distribution of the polymer to be blended, in addition to their molecular weights to which attention was exclusively paid in the prior art, not only the melt tension, ESCR and moldability of the blend but also the compatibility of the polymer can be substantially improved and, therefore, the development of shark skin in molded articles can be prevented. The present invention has been completed on the basis of this finding.

Briefly stated, the present invention provides polyethylene composition having a melt index (ASTM D-1238-73, Condition E) of 0.001 to 1 g/10 min and a density (ASTM D-1505-68) of 0.940 to 0.960 g/cm$^3$, which comprises a blend of 80 to 97% by weight of polyethylene having a density of 0.940 to 0.960 g/cm$^3$, an intrinsic viscosity of 2.0 to 5.0 dl/g as measured in decalin at 135° C., and an N value of 2.0 to 3.5, polyethylene having been obtained by polymerizing ethylene, optionally together with an α-olefin of up to 4 carbon atoms, according to a two-step polymerization process using a Ziegler catalyst containing at least magnesium and titanium, the two-step polymerization process including (a) the first step of carrying out the polymerization at a temperature of 30° to 100° C. in such a way that polyethylene having an intrinsic viscosity of up to 7.2 dl/g as measured in decalin at 135° C. is formed in an amount of 5 to 70% by weight based on the total amount of the finally obtained polyethylene and (b) the second step of carrying out the polymerization at a temperature of 30° to 100° C. in such a way that polyethylene having an intrinsic viscosity of 0.6 to 1.7 dl/g as measured in decalin at 135° C. is formed in an amount of 95 to 30% by weight based on the total amount of the finally polyethylene, and (B) 20 to 3% by weight of polyethylene having a density of 0.940 to 0.960 g/cm³, an intrinsic viscosity of 7.0 to 15.0 dl/g as measured in decalin at 135° C., and an N value of 2.5 to 3.5, the poly ethylene having been obtained by polymerizing ethylene with the aid of a catalyst composed of a solid component containing at least chromium trioxide, and a compound of the general formula

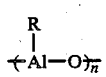

where R is a hydrocarbon radical of 1 to 18 carbon atoms, and n is a whole number of 2 to 100.

The present invention will be more specifically described hereinbelow

DETAILED DESCRIPTION OF THE PREFERRED EMBODIMENTS

The polyethylene (hereinafter referred to as component (A)) used in the present invention is polymer obtained by polymerizing ethylene, optionally together with an α-olefin of up to 4 carbon atoms, according to a two-step polymerization process using a Ziegler catalyst containing at least magnesium and titanium, and characterized by a density of 0.940 to 0.960 g/cm³, an intrinsic viscosity [η] of 2.0 to 5.0 dl/g, preferably 2.5 to 4.5 dl/g, as measured in decalin at 135° C., and an N value of 2.0 to 3.5, preferably 2.2 to 3.5.

If the density of component (A) is less than 0.940 g/cm³, the resulting composition will show a reduction in rigidity, while if it is greater than 0.960 g/cm³, the resulting composition will show a reduction in impact resistance. If the intrinsic viscosity [η] is less than 2.0 dl/g, the resulting composition will have poor moldability, while if it is greater than 5.0 dl/g, the resulting composition will have poor compatibility and low melting characteristics. N value is a measure of the non-Newtonian viscosity of a molten polymer, but also serves as a measure of the its molecular-weight distribution (the method for the measurement of N value will be described later). If the N value is less than 2.0, the resulting composition will have a narrow molecular-weight distribution and hence poor moldability and compatibility, while if it is greater than 3.5, the resulting composition will tend to undergo gelation and may have poor compatibility.

The Ziegler catalyst used in the preparation of component (A) is a catalyst containing at least magnesium and titanium. More specifically, this Ziegler catalyst is chiefly composed of (a) a solid component formed by providing a magnesium compound selected from magnesium halides, alkylmagnesium halides, magnesium alkoxydes, magnesium oxide, magnesium hydroxide, magnesium carbonate and the like, optionally treating or reacting it with a compound selected from electron donors (such as alcohols, aldehydes, ketones, ethers, carboxylic acids, esters, thiols, acid amides, amines, nitriles, organic phosphates, organic phosphites, etc.), halides (such as halogenated hydrocarbons, aluminum chloride, silicon tetrachloride, etc.), silicon compounds (such as alkoxysilanes, alkoxyhalosilanes, etc.) and the like, and then supporting thereon or reacting therewith a trivalent titanium compound obtained by reducing a tetravalent titanium compound (such as titanium tetrachloride, alkoxyhalotitanium or the like) with hydrogen, aluminum, titanium or an organometallic compound; and (b) an organoaluminum compound selected from trialkylaluminums, dialkylaluminum halides, alkylaluminum sesquihalides and the like.

Although two-step polymerization using the above-described catalyst can be carried out according to any of various polymerization techniques such as slurry polymerization and vapor-phase polymerization, slurry polymerization is preferred. The first step of the two-step polymerization serves to form a high-molecular-weight component. More specifically, ethylene is polymerized at a temperature of 30° to 100° C., preferably 40° to 95° C., in such a way that a polymer having an intrinsic viscosity [η] of 1.3 to 7.2 dl/g, preferably 1.7 to 7.0 dl/g, is formed in an amount of 5 to 70% by weight, preferably 10 to 60% by weight, of the finally obtained polymer. The succeeding second step serves to form a low-molecular-weight component. More specifically, ethylene is polymerized at a temperature of 30° to 100° C., preferably 60° to 95° C., in such a way that a polymer having an intrinsic viscosity [η] of 0.6 to 1.7 dl/g, preferably 1.0 to 1.7 dl/g, is formed in an amount of 95 to 30% by weight, preferably 90 to 40% by weight, of the finally obtained polymer.

The molecular weight (as represented by the intrinsic viscosity [η]) of the polymer formed in each step can be controlled by varying the polymerization temperature and/or the composition of the catalyst. However, it can be most effectively controlled by adding hydrogen to the polymerization system. The α-olefins of up to 4 carbon atoms which may optionally be added to the polymerization system are propylene and butene-1. Although these α-olefins can be added in either the first or the second step, they are preferably added in the first step. These α-olefins should preferably be used in an amount of 0.5 to 5 mole percent based on the amount of ethylene.

In either of the first and second steps, if the polymerization temperature is lower than 30° C., the polymerization rate will be so low that too much time will be required to form a given amount of polymer and the polymerization temperature may be difficult to control. On the other hand, if the polymerization temperature is higher than 100° C., the resulting polymer will undesirably tend to melt and form blocks.

If the intrinsic viscosities [η] of the polymers formed in the first and second steps are less than 1.3 dl/g and 0.6 dl/g, respectively, the intrinsic viscosity [η] of component (A) will be unduly low and the resulting composition will have poor moldability. On the other hand, if they are greater than 7.2 dl/g and 1.7 dl/g, respectively, the intrinsic viscosity [η] of component (A) will be excessively high. If the amount of polymer formed in the first step is greater than 70% by weight of the total polymer or less than 5% by weight of the total polymer, the N value of component (A) will be outside the required range and the resulting composition will have poor compatibility and moldability.

Polymer having properties similar to those of component (A) can be obtained according to the two-step polymerization process in which polymers having different molecular weights are formed in the reverse order, i.e., the process including the first step of forming a low-molecular-weight constituent and the second step of forming a high-molecular-weight constituent. However, this polymer cannot be used in the composition of the present invention because of its poor compatibility.

On the other hand, the high-molecular-weight polyethylene (hereinafter referred to as component (B)) used as the other component in the present invention is a compound obtained by polymerizing ethylene with the aid of a specific chromium-containing catalyst, and characterized by a density of 0.940 to 0.960 g/cm$^3$, an intrinsic viscosity [$\eta$] of 7.0 to 15 dl/g, preferably 7.0 to 12 dl/g, as measured in decalin at 135° C., and N value of 2.5 to 3.5, preferably 2.7 to 3.5.

If the density of component (B) is less than 0.940 g/cm$^3$, the resulting composition will show a reduction in rigidity, while if it is greater than 0.960 g/cm$^3$, the resulting composition will show a reduction in impact resistance. If the intrinsic resistance [$\eta$] is less than 7.0 dl/g, the resulting composition will show a decrease in melt tension, while if it is greater than 15 dl/g, component (B) will tend to undergo gelation and the resulting composition will have poor compatibility. If the N value is outside the aforesaid range, the composition will have poor compatibility and tend to undergo gelation.

The chromium-containing catalyst used for the preparation of component (B) is a catalyst composed of a solid component containing at least chromium trioxide, and a compound of the general formula

where R is a hydrocarbon radical of 1 to 18 carbon atoms, and n is a whole number of 2 to 100, preferably to 50. Alternatively, this catalyst may contain a compound of the general formula

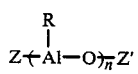

where R is a hydrocarbon radical of 1 to 18 carbon atoms, Z and Z' are hydrogen atoms or R radicals, and n is a whole number of 2 to 100, preferably 2 to 50, or compound of the general formula (AlRO)$_n$ where R is a hydrocarbon radical of 1 to 18 carbon atoms, and n is a whole number of 3 to 100, preferably 3 to 50. The aforesaid solid component is formed by providing an inorganic oxide carrier, supporting thereon chromium trioxide or a compound at least partly convertible to chromium trioxide by calcining, and then calcining the chromium compound supported on the carrier. Useful inorganic oxide carriers include silica, alumina, silica-alumina, titania, zirconia, toria, and mixtures thereof. Especially preferred are silica and silica-alumina.

The chromium compounds which can be supported on the carrier include oxides of chromium, and compounds at least partly convertible to chromium trioxide by calcining, such as the halides, oxyhalides, nitrates, acetates, sulfates, alcoholates, etc. Specific examples thereof are chromium trioxide, chromyl chloride, potassium bichromate, ammonium chromate, chromium nitrate, chromium acetate, chromium acetylacetonate, di-tert-butyl chromate and the like.

In order to support the chromium compound on the carrier, there may be employed any of well-known methods including impregnation, solvent evaporation, sublimation and the like. Any suitable method may be selected and employed according to the type of chromium compound used. The amount of chromium compound supported on the carrier should be such that chromium atom is present in an amount of 0.1 to 10% by weight, preferably 0.3 to 5% by weight and more preferably 0.5 to 3% by weight of chromium atom, based on the carrier.

The carrier on which the chromium compound was supported in the above-described manner is then activated by calcining. Although this calcining is generally carried out in a non-reducing atmosphere (e.g., oxygen gas) substantially free of moisture, it may also be carried out in the presence of an inert gas or under reduced pressure. Among others, dry air is preferably used. The calcining temperature should be 450° C. or above and preferably from 500° to 900° C., and the calcining time should be from several minutes to several hours and preferably from 0.5 to 10 hours. For purposes of activation, the calcining should preferably be carried out in an ample flow of dry air.

Moreover, according to the well-known method for controlling the activity of the catalyst, titanates of fluorine-containing salts may be added thereto at the time of supporting or calcining.

The chromium-containing catalyst also contains a compound of the general formula

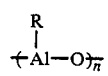

where R is a hydrocarbon radical of 1 to 18 carbon atoms, and n is a whole number of 2 to 100, preferably 2 to 50. This compound (hereinafter referred to as a modified organoaluminum compound) is obtained by the reaction of a trialkylaluminum with water. The reaction of a trialkylaluminum with water is usually carried out in an inert hydrocarbon. Useful inert hydrocarbons include aliphatic, alicyclic and aromatic hydrocarbons such as pentane, hexane, heptane, cyclohexane, methylcyclohexane, benzene, toluene, xylene, etc. Among others, aliphatic and alicyclic hydrocarbons are preferred.

The alkyl groups present in the aforesaid trialkylaluminum can be, for example, ethyl, propyl, isopropyl, butyl, isobutyl, pentyl, hexyl, octyl, decyl, dodecyl and like groups. However, isobutyl groups are especially preferred.

The proportion of water to the trialkylaluminum (i.e., the molar ratio of water to aluminum) should range from 0.25:1 to 1.2:1 and preferably from 0.5:1 to 1:1. The reaction temperature should be from −70° to 100° C. and preferably from −70° to 20° C. The reaction time may be from 5 to 100 minutes and preferably from 10 to 30 minutes. The modified organoaluminum compound thus obtained should be used in such an amount that the molar ratio of aluminum to chromium ranges from 1,000:1 to 1:1 and preferably from 100:1 to 10:1.

Although the polymerization of ethylene can be carried out according to any of various polymerization techniques such as slurry polymerization, solution polymerization and vapor-phase polymerization, slurry polymerization is preferred. The polymerization is carried out at a temperature of 50° to 100° C., preferably 50° to 90° C., in an inert solvent such as butane, pentane, hexane, heptane, benzene, toluene, cyclohexane or the like. Although no particular limitation is placed on the polymerization time, it usually ranges from 5 minutes to 10 hours and preferably from 5 minutes to 5 hours. The molecular weight (i.e., the intrinsic viscosity [$\eta$]) and the molecular-weight distribution can be controlled by varying the temperature of the polymerization system, the molar ratio of the catalyst components, the concentration of hydrogen, and the like. If desired, ethylene may be copolymerized with an $\alpha$-olefin of 3 to 8 carbon atoms.

Then, 80 to 97% by weight, preferably 90 to 95% by weight, the above-described component (A) and 20 to 3% by weight, preferably 10 to 5% by weight, of the above-described component (B) are blended together to obtain polyethylene composition having a melt index (MI) of 0.001 to 1 g/10 min, preferably 0.001 to 0.5 g/10 min, and a density of 0.940 to 0.960 g/cm$^3$.

If the amount of component (B) is less than 3% by weight, the resulting composition will show a reduction in melt tension, while if it is greater than 20% by weight, the resulting composition will have poor compatibility and show a reduction in ESCR.

The method for blending component (A) with component (B) is not critical, and any of various methods may be used, so long as a homogeneous composition is obtained. For example, this may be accomplished by preparing both components separately and intimately blending them under heated conditions in any of various mixers such as extruders, roll mills, etc., or by preparing one component and subsequently preparing the other component in the presence of the one component.

In the present polyethylene compositions obtained in the above-described manner, components (A) and (B) have so good compatibility that they are in the intimately blended state and the resulting compositions can give molded articles having neither gel content nor shark skin. Moreover, because of their excellent ESCR and high density, the polyethylene compositions of the present invention can achieve high mechanical strength and rigidity. Furthermore, because of their high melt tension and good moldability, they are suitable for the fabrication of vessels of very large size, such as automobile fuel tanks, drums and the like.

The composition of the present invention can additionally contain common additives such as antioxidants, antistatic agents, ultraviolet light absorbefacients, colorants, lubricants and the like, as well as various fillers such as carbon black, silica, calcium carbonate, gypsum, organic or inorganic fibers and the like.

The present invention is further illustrated by the following examples. However, these examples are not to be construed to limit the scope of the invention.

The measuring methods used in Examples and Comparative Examples are described below.

The polymers obtained in Examples and Comparative Examples were pretreated in the following manner and then used in the measurement of properties.

Pretreatment

Using an 18 mm single-screw extruder (manufactured by Create Plastic Co.), butylhydroxytoluene (antioxidant) was added to the polymer in an amount of 0.1% by weight based on the total amount thereof. Then, the polymer was pelletized by blending and extruding it at a temperature of 200° C. and a rotational speed of 70 rpm.

Measuring methods

N value:

Using a flow tester (manufactured by Shimazu Seisakusho), the molten resin was extruded at 170° C. through a die ($L/D=20$) having a diameter (D) of 2 mm and a length (L) of 40 mm. Then, its N value was calculated according to the following equation.

$$N \text{ value} = \frac{\log(\gamma_{150}/\gamma_{20})}{\log(\tau_{150}/\tau_{20})}$$

In the above equation, $\tau$ represents shear rate and $\gamma$ represents shear stress. The subscripts 150 and 20 represent loads of 150 kg/cm$^2$ and 20 kg/cm$^2$, respectively.

Melt tension (MT):

Using a melt tension tester (manufactured by Toyo Seiki Co., Ltd.), the polymer was melted in a cylinder (9.55 mm in inner diameter) at a melt temperature of 190° C., and extruded through an orifice (2.10 mm in diameter and 8.00 mm in length) at a constant rate (i.e., a piston falling speed of 20 mm/min). The extruded strand was drawn off through a load cell by a roller (5.0 cm in outer diameter) rotating at a speed of 100 rpm, and the produced stress (in g) was regarded as the melt tension. When the strand was broken before the rotational speed of the roller reached 100 rpm, the stress measured at that point was regarded as the melt tension.

Environmental stress cracking resistance (ESCR):

According to JIS K-6760, specimens were exposed to a test solution containing 10% by volume of Liponox NCI. The ESCR was expressed as the time elapsed until half of the specimens were cracked.

Tensile impact strength (TIS):

A compression-molded sheet having a thickness of 0.6 mm was tested according to ASTM D-1822.

Compatibility:

A portion of the pellets obtained as a result of the pretreatment was compression-molded at 190° C. L to a sheet having a thickness of 50 $\mu$m. Then, according to the criteria given below, the composition was evaluated on the basis of the number of gel particles present in an area measuring 10 cm $\times$ 10 cm.

Homogeneous or 1 to 2 gel particles O
3 to 9 gel particles $\Delta$
10 or more gel particles X Examples and Comparative Examples The polyethylene (as component (A)) and polyethylene (as component (B)) used in the following examples and comparative examples were obtained in the following manner.

(1) Preparation of solid catalyst components (Preparation of (A1))

In a 400 ml stainless steel pot containing 25 stainless steel balls of ½ inch diameter, 10 g of anhydrous magnesium chloride, 0.5 g of 1,2-dichloroethane and 1.7 g of titanium tetrachloride were charged in an atmosphere of nitrogen. These materials were ball-milled at room temperature for 16 hours to obtain a solid catalyst component (A1). Each gram of this solid catalyst component (A1) contained 35 mg of titanium.

(Preparation of (A2))

Into a stainless steel pot similar to that used in the preparation of (A1), 10 g of anhydrous magnesium chloride, 4.4 g of aluminum triethoxide and 2.7 g of titanium tetrachloride were charged in an atmosphere of nitrogen. These materials were ball-milled at room temperature for 16 hours to obtain a solid catalyst component (A2). Each gram of this solid catalyst component (A2) contained 39 mg of titanium.

(Preparation of (B1))

Silica (Grade 952; a product of Fuji Davison Co.) was vacuum-dried at 300° C. for 3 hours. Then, 20 g of the silica was added to a solution formed by dissolving 0.4 g of chromium trioxide in 100 ml of water, followed by stirring at room temperature for 1 hour. Thereafter, the solid component was dewatered at 120° C. in a stream of nitrogen and then vacuum-dried at 120° C. for 10 hours. Subsequently, the solid component was activated by calcining it at 800° C. for 3 hours in a fluidized bed through which oxygen was passed. The activated catalyst component (B1) was stored in an atmosphere of nitrogen.

(Preparation of (B2))

Silica (Grade 952; a product of Fuji Davison Co.) was vacuum-dried at 300° C. for 3 hours. Then, 20 g of the silica was placed in a 300-ml three neck flask, 150 ml of dried hexane was added thereto, and 0.6 g of t-butyl chromate was dissolved therein. After this mixture was stirred at room temperature for 1 hour, the hexane was distilled off at 80° C. in a stream of nitrogen and the solid material was vacuum-dried at that temperature for 5 hours. Subsequently, this solid material was activated by calcining it at 800° C. for 3 hours in a fluidized bed through which oxygen was passed. The activated catalyst component (B2) was stored in an atmosphere of nitrogen.

(2) Preparation of polyethylene (for use as component (A))

(Preparation of (AE1))

1.35 $m^3$/hr of hexane, 1.0 mole/hr of triethylaluminum, 9.0 g/hr of the aforesaid solid catalyst component (A1) and 15 kg/hr of ethylene were continuously fed to a reactor having an internal volume of 0.9 $m^3$ and equipped with a stirrer. During this process, the first-step reactor was maintained at a temperature of 85° C., and a gaseous phase was established by introducing nitrogen gas under pressure into the upper part of the reactor and maintaining it at a pressure of 17.0 kg/$cm^2$G. Under the action of differential pressure, the slurry-like polymerization mixture was withdrawn from the bottom of the first-step reactor and fed through a pipeline to a second-step stirred tank reactor having an internal volume of 2.0 $m^3$. In this second-step reactor, ethylene and hydrogen were additionally fed and the polymerization mixture was maintained at a temperature of 85° C., a total pressure of 16 kg/$cm^2$G and a liquid-phase volume of 1.5 $m^3$. In the gaseous phase within the second-step reactor, the molar ratio of ethylene to hydrogen was kept at 30:70. This two-step polymerization process wa carried out for 100 hours. The polymerization mixture was continuously withdrawn, and the polymer was recovered therefrom and dried. Properties of the polyethylene (AE1) thus obtained are shown in Table 1.

(Preparation of (AE2))

Polymerization was carried out in the same manner as described in the preparation of (AE1), except that 0.7 kg/hr of propylene, in addition to the ethylene, was fed to the first-step reactor. Properties of the polyethylene (AE2) thus obtained are shown in Table 1.

(Preparation of (AE3))

Using the same reaction apparatus as used in the preparation of (AE1), 1.35 $m^3$/hr of hexane, 1.0 mole/hr of triethylaluminum, 9.0 g/hr of a solid catalyst component (A2), 37 kg/hr of ethylene, 1.3 kg/hr of butene-1 and 25 g/hr of hydrogen were continuously fed to the first-step reactor maintained at a temperature of 85° C. Moreover, in the gaseous phase within the second-step reactor, the molar ratio of ethylene to hydrogen was kept at 35:65. The other conditions were the same as described in the preparation of (AE1). Properties of the ethylene copolymer (AE3) thus obtained are shown in Table 1.

(Preparation of (AE4))

Ethylene was polymerized in hexane at a temperature of 65° C. and a partial pressure of ethylene of 10 kg/$cm^2$G in the presence of a catalyst comprising a solid catalyst component (A1) and triethylaluminum (single-step polymerization). Properties of the polyethylene (AE4) thus obtained are shown in Table 1.

(Preparation of (AE5) and (AE6))

Ethylene was polymerized in hexane in the presence of a catalyst comprising a solid catalyst component (A1) and triethylaluminum (single-step polymerization). In this case, the polymerization temperature and the partial pressure of hydrogen were varied to modify the molecular weight of the resulting polymer. The ethylene polymer obtained at a polymerization temperature of 90° C. was named (AE5), while that obtained at a polymerization temperature of 80° C. was named (AE6). Properties of these polyethylene are shown in Table 1.

(3) Preparation of polyethylene (for use as component (B))

(Preparation of (BE1) and (BE2))

Using a 50-liter continuous polymerization apparatus, 20 liters/hr of hexane was continuously fed thereto. Then, 100 mg/liter of a solid catalyst component (B1), 0.63 mmole/liter of a modified organoaluminum compound (prepared from triisobutylaluminum and water in the manner described below) and ethylene were fed in such amounts as to produce 4 kg/hr of polymer. Thus, polymerization was carried out at 80° C. to obtain polyethylene (BE1). Moreover, polymerization was carried out in the same manner as described above in the preparation of (BE1), except that another solid catalyst component (B2) was used in place of (B1). Thus, there was obtained polyethylene (BE2). Properties of (BE1) and (BE2) are shown in Table 1.

(Preparation of a modified organoaluminum compound)

Under cooling with ice, 54 ml of purified water which had been deoxygenated by blowing nitrogen therethrough was added, in 100-$\mu$l portions, to 3 liters of a solution of triisobutylaluminum in hexane (having a concentration of 1 mmole/ml). The molar ratio of water to aluminum was 1:1. The resulting mixture was allowed to react at room temperature for 30 minutes.

After completion of the reaction, there was obtained a clear, homogeneous solution.

(Preparation of (BE3))

Ethylene was polymerized in the same manner as described in the preparation of (BE1), except that the polymerization temperature was altered to 60° C. Properties of the polyethylene (BE3) thus obtained are shown in Table 1.

(Preparation of (BE4))

Using hydrogen as a molecular weight modifier, ethylene was polymerized at a temperature of 100° C. and a total pressure of 40 kg/cm²G in the presence of a solid catalyst component (B1) alone. Properties of the polyethylene (BE4) thus obtained are shown in Table 1.

(4) Examples 1 to 12 and Comparative Examples 1 to 9

The aforesaid polyethylene (AE1) to (AE6) and polyethylenes (BE1) to (BE4) were mixed in the respective proportions indicated in Tables 2 and 3, and the resulting mixtures were subjected to the above-described pretreatment. Various properties of the resulting compositions were tested and the results thus obtained are shown in Tables 2 and 3.

It is evident from a comparison of the data shown in Tables 2 and 3 that, among various compositions consisting of the same components A and B, those lying outside a specified compositional range fail to exhibit a well-balanced combination of properties. Moreover, it can also be seen that, though having the same molecular weight (i.e., the same intrinsic viscosity [$\eta$], components having a low N value (and hence a narrow molecular-weight distribution) exhibit inadequate compatibility and only give compositions having low melt tension.

TABLE 1

| | Properties of components (A) and (B) | | | | | |
|---|---|---|---|---|---|---|
| | Two-step polymerization | | | | | |
| Components | [$\eta$] step 1/step 2 | Weight ratio of products step 1/step 2 | [$\eta$] (dl/g) | Density (g/cm³) | N value | Bulk density (g/cm³) |
| AE1 | 7.1/0.8 | 26/74 | 2.41 | 0.951 | 2.61 | 0.33 |
| AE2 | 6.1/0.8 | 30/70 | 2.35 | 0.948 | 2.58 | 0.31 |
| AE3 | 3.5/1.0 | 41/59 | 2.03 | 0.955 | 2.30 | 0.33 |
| AE4 | — | — | 8.80 | 0.950 | 1.92 | 0.30 |
| AE5 | — | — | 1.10 | 0.960 | 1.80 | 0.29 |
| AE6 | — | — | 3.50 | 0.956 | 1.60 | 0.30 |
| BE1 | — | — | 7.29 | 0.953 | 2.86 | 0.33 |
| BE2 | — | — | 7.00 | 0.953 | 2.80 | 0.32 |
| BE3 | — | — | 11.00 | 0.954 | 2.91 | 0.34 |
| BE4 | — | — | 3.50 | 0.949 | 2.00 | 0.24 |

TABLE 2

| | Composition | | MI (g/10 min) | Density (g/cm³) | MT (g) | ESCR (hr) | TIS (kg · cm/cm²) | Compatibility |
|---|---|---|---|---|---|---|---|---|
| | Component | Weight ratio | | | | | | |
| Example | | | | | | | | |
| 1 | AE1/BE1 | 90/10 | 0.38 | 0.951 | 42.5 | 185 | 430 | |
| 2 | " | 93/7 | 0.046 | 0.951 | 30.0 | 185 | 360 | |
| 3 | " | 95/5 | 0.055 | 0.951 | 28.0 | 195 | 300 | |
| 4 | " | 97/3 | 0.061 | 0.951 | 27.0 | 200 | 293 | |
| 5 | AE2/BE1 | 90/10 | 0.046 | 0.949 | 30.5 | 190 | 351 | |
| 6 | AE3/BE2 | 90/10 | 0.093 | 0.955 | 22.0 | 175 | 289 | |
| 7 | " | 93/7 | 0.123 | 0.955 | 21.0 | 180 | 270 | |
| 8 | " | 95/5 | 0.154 | 0.955 | 19.5 | 190 | 241 | |
| 9 | " | 97/3 | 0.201 | 0.955 | 18.5 | 205 | 200 | |
| 10 | " | 80/20 | 0.031 | 0.955 | 50.0 | 170 | 380 | |
| 11 | AE3/BE3 | 90/10 | 0.030 | 0.955 | 41.0 | 195 | 400 | |
| Comparative Examples | | | | | | | | |
| Comparative Example | | | | | | | | |
| 1 | AE3/BE2 | 50/50 | 0.001 | 0.955 | 37.0 | 70 | 390 | X |
| 2 | " | 70/30 | 0.01 | 0.955 | 32.0 | 85 | 360 | Δ |
| 3 | AE3/— | 100/0 | 0.320 | 0.955 | 9.0 | 195 | 150 | — |
| 4 | —/BE1 | 0/100 | — | 0.953 | Not tested because of unmoldability | | | |
| 5 | AE1/BE4 | 90/10 | 0.06 | 0.950 | 18.5 | 190 | 300 | |
| 6 | AE1/AE5 | 90/10 | 0.036 | 0.951 | 18.0 | 180 | 350 | Δ |
| 7 | AE5/BE1 | 90/10 | Not tested because of poor compatibility | | | | | X |
| 8 | AE5/BE4 | 90/10 | 3.00 | 0.959 | 2.0 | 135 | 115 | X |
| 9 | AE6/BE2 | 90/10 | Not tested because of poor compatibility | | | | | X |

We claim:

1. A polyethylene composition having a melt index of 0.001 to 1 g/10 min and a density of 0.940 to 0.960 g/cm³, which comprises a blend of (A) 80 to 97% by weight of polyethylene having a density of 0.940 to 0.960 g/cm³, an intrinsic viscosity of 2.0 to 5.0 dl/g as measured in decalin at 135° C., and an N value of 2.0 to 3.5, the polyethylene having been obtained by polymerizing ethylene, optionally together with an α-olefin of up to 4 carbon atoms, according to a two-step polymerization process using a Ziegler catalyst containing at least magnesium and titanium, the two-step polymerization process including (a) the first step of carrying out the polymerization at a temperature of 30° to 100° C. in such a way that polyethylene having an intrinsic viscosity of up to 7.2 dl/g as measured in decalin at 135° C. is formed in an amount of 5 to 70% by weight based on the total amount of the finally obtained polyethylene and (b) the second step of carrying out the polymerization at a temperature of 30° to 100° C. in such a way that polyethylene having an intrinsic viscosity of 0.6 to 1.7 dl/g as measured in decalin at 135° C. is formed in an amount of 95 to 30% by weight based on the total amount of the finally obtained polyethylene, and (B) 20 to 3% by weight of polyethylene having a density of 0.940 to 0.960 g/cm$^3$, an intrinsic viscosity of 7.0 to 15.0 dl/g a measured in decalin at 135° C., and an N value of 2.5 to 3.5, the polyethylene having been obtained by polymerizing ethylene with the aid of a catalyst composed of a solid component containing at least chromium trioxide, and a compound of the general formula

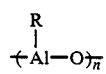

where R is a hydrocarbon radical of 1 to 18 carbon atoms, and n is a whole number of 2 to 100.

2. The polyethylene composition of claim 1 wherein component (A) has an N value of 2.2 to 3.5.

3. The polyethylene composition of claim 1 wherein component (B) has an N value of 2.7 to 3.5.

4. The polyethylene composition of claim 1 wherein component (A) has an intrinsic viscosity of 2.5 to 4.5 dl/g.

5. The polyethylene composition of claim 1 wherein component (B) has an intrinsic viscosity of 7.0 to 12 dl/g.

6. The polyethylene composition of claim 1 wherein 90 to 5% by weight of component (A) is blended with 10 to 5% by weight of component (B).

7. The polyethylene composition of claim 1 wherein component (B) has been obtained by polymerizing ethylene with the aid of a catalyst containing a compound of the general formula

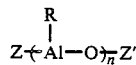

where R is a hydrocarbon radical of 1 to 18 carbon atoms, Z and Z' are hydrogen atoms or R radicals, and n is a whole number of 2 to 100.

8. The polyethylene composition of claim 1 wherein component obtained by polymerizing ethylene with the aid of a catalyst containing a compound of the general formula $(AlRO)_n$ where is a hydrocarbon radical of 1 to 18 carbon atoms, and n is a whole number of 3 to 100.

* * * * *